United States Patent
Stewart et al.

(10) Patent No.: US 9,651,399 B2
(45) Date of Patent: May 16, 2017

(54) CONTINUOUS CALIBRATION OF AN INERTIAL SYSTEM

(71) Applicants: Robert E. Stewart, Woodland Hills, CA (US); Charles A. Lee, Camarillo, CA (US)

(72) Inventors: Robert E. Stewart, Woodland Hills, CA (US); Charles A. Lee, Camarillo, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 177 days.

(21) Appl. No.: 14/668,465

(22) Filed: Mar. 25, 2015

(65) Prior Publication Data

US 2016/0282137 A1    Sep. 29, 2016

(51) Int. Cl.
*G01P 21/00* (2006.01)
*G01C 25/00* (2006.01)

(52) U.S. Cl.
CPC ............ *G01C 25/005* (2013.01); *G01P 21/00* (2013.01)

(58) Field of Classification Search
CPC ....... G01P 21/00; G01P 15/0888; G01P 15/14
See application file for complete search history.

(56) References Cited

U.S. PATENT DOCUMENTS

| | | | | |
|---|---|---|---|---|
| 3,350,916 A | | 11/1967 | Bock | |
| 3,782,167 A | * | 1/1974 | Stuelpnagel | G01C 25/00 73/1.77 |
| 3,830,091 A | * | 8/1974 | Sinsky | G01P 21/00 73/1.38 |
| 5,348,519 A | * | 9/1994 | Prince | A63B 24/00 414/744.3 |
| 6,778,924 B2 | * | 8/2004 | Hanse | G01P 21/00 702/88 |
| 6,968,281 B2 | * | 11/2005 | Hanse | G01P 21/00 702/85 |
| 7,739,896 B2 | * | 6/2010 | Stewart | G01C 19/5776 73/1.37 |

(Continued)

FOREIGN PATENT DOCUMENTS

JP      2007232443 A      9/2007
WO   WO 2007/018689 A1   2/2007
WO   WO 2013/033754 A1   3/2013

OTHER PUBLICATIONS

Extended European Search Report for corresponding EP 16 15 4929.0 dated Jul. 14, 2016.

(Continued)

*Primary Examiner* — David A Rogers
(74) *Attorney, Agent, or Firm* — Tarolli, Sundheim, Covell & Tummino LLP (57) ABSTRACT

One embodiment of the invention includes an inertial system. The system includes at least one inertial sensor configured to measure an inertial parameter associated with each of at least one axis. The system also includes a calibration system configured to sequentially measure an inertial calibration parameter at each of a plurality input axes. The system further includes an inertial processor configured to calculate motion of the inertial system based on the inertial parameter associated with each of the respective at least one axis and the sequential measurements of the inertial calibration parameter at each of the plurality of input axes.

19 Claims, 3 Drawing Sheets

(56) References Cited

U.S. PATENT DOCUMENTS

| | | | | |
|---|---|---|---|---|
| 8,010,308 B1* | 8/2011 | Churchill | G01C 21/16 | 702/104 |
| 8,136,382 B2* | 3/2012 | Stewart | G01C 19/5776 | 73/1.37 |
| 8,315,822 B2* | 11/2012 | Berme | A61B 5/1036 | 702/101 |
| 8,424,363 B2* | 4/2013 | Caron | G01C 19/56 | 73/1.77 |
| 8,527,228 B2* | 9/2013 | Panagas | G01C 25/005 | 702/104 |
| 8,583,392 B2* | 11/2013 | Panagas | G01C 21/16 | 702/104 |
| 8,626,471 B2* | 1/2014 | Kennedy | G01P 21/00 | 340/480 |
| 8,733,170 B2* | 5/2014 | Lasalandra | B81B 3/0081 | 73/1.38 |
| 9,024,772 B2* | 5/2015 | Wang | G01C 21/165 | 33/320 |
| 2003/0084704 A1* | 5/2003 | Hanse | G01C 25/005 | 73/1.38 |
| 2004/0211238 A1* | 10/2004 | Hanse | G01P 21/00 | 73/1.38 |
| 2006/0059976 A1* | 3/2006 | Simonenko | G01P 15/0888 | 73/1.38 |
| 2008/0202199 A1* | 8/2008 | Finley | G01C 25/005 | 73/1.77 |
| 2010/0218587 A1* | 9/2010 | Stewart | G01C 19/5776 | 73/1.37 |
| 2011/0113853 A1* | 5/2011 | Netzer | G01D 18/008 | 73/1.77 |
| 2011/0167893 A1* | 7/2011 | Frey, Jr. | F41G 7/007 | 73/1.77 |
| 2011/0202300 A1 | 8/2011 | Udagawa et al. | | |
| 2011/0285129 A1* | 11/2011 | Li | F03D 1/06 | 290/44 |
| 2011/0301902 A1* | 12/2011 | Panagas | G01C 21/16 | 702/104 |
| 2012/0050095 A1* | 3/2012 | Scherzinger | G01S 19/47 | 342/357.3 |
| 2012/0203486 A1* | 8/2012 | Almalki | G01C 17/28 | 702/96 |
| 2012/0215477 A1* | 8/2012 | Tuck | G01P 21/00 | 702/99 |
| 2012/0247176 A1 | 10/2012 | Ou et al. | | |
| 2012/0271565 A1* | 10/2012 | Berme | A61B 5/1036 | 702/41 |
| 2013/0121367 A1* | 5/2013 | Ahuja | G01C 25/00 | 374/1 |
| 2014/0208823 A1* | 7/2014 | Trusov | G01P 21/00 | 73/1.38 |
| 2014/0298883 A1* | 10/2014 | Becheret | G01C 25/005 | 73/1.38 |

OTHER PUBLICATIONS

Office Action Issued Oct. 4, 2016 for corresponding Japanese Application Serial No. 2016-035583.

* cited by examiner

CONTINUOUS CALIBRATION OF AN INERTIAL SYSTEM

TECHNICAL FIELD

This disclosure relates generally to sensor systems, and specifically to continuous calibration of an inertial system.

BACKGROUND

Inertial sensing systems can be implemented in a variety of applications, such as for navigation (e.g., aeronautical navigation). Examples of inertial sensing instruments can include gyroscopes, magnetometers, and/or a combination thereof. Scale-factor and bias error can be major sources of error in inertial measurement and/or navigation systems. Bias error can arise due to transient behavior at turn on, non-modelability, and instability of bias versus temperature characteristics including hysteresis and can simply trend over time. Mitigation of scale-factor and bias error in inertial sensing devices, particularly in a dynamic environment, could significantly improve the performance of inertial measurement and navigation systems.

SUMMARY

One embodiment of the invention includes an inertial system. The system includes at least one inertial sensor configured to measure an inertial parameter associated with each of at least one axis. The system also includes a calibration system configured to sequentially measure an inertial calibration parameter at each of a plurality input axes. The system further includes an inertial processor configured to calculate motion of the inertial system based on the inertial parameter associated with each of the respective at least one axis and the sequential measurements of the inertial calibration parameter at each of the plurality of input axes.

Another embodiment of the invention includes a method for calculating an inertial parameter. The method includes rotating a calibration system to a plurality of predetermined orientations and measuring an inertial calibration parameter at each of a plurality input axes associated with the plurality of predetermined orientations. The plurality of input axes can be associated with each of a first plane and a second plane that are orthogonal with respect to each other. The method also includes measuring an inertial parameter associated with a respective at least one orthogonal axis and calculating a bias error of the inertial parameter associated with the respective at least one orthogonal axis based on the inertial calibration parameter at each of a plurality input axes associated with the plurality of predetermined orientations. The method further includes calculating a motion of the inertial system based on the inertial parameter associated with each of the respective at least one orthogonal axis and based on the calculated bias error of the inertial parameter associated with a respective at least one orthogonal axis.

Another embodiment of the invention includes an inertial system. The system includes a plurality of accelerometers configured to measure an acceleration along each of a respective plurality of orthogonal axes and a plurality of gyroscopes configured to measure a rotation about each of the respective plurality of orthogonal axes. The system also includes a calibration system configured to sequentially measure a calibration acceleration and a calibration rotation associated with each of a plurality input axes having a predetermined relationship with the plurality of orthogonal axes. The system also includes an inertial processor configured to calculate motion of the inertial system based on the measured acceleration and the measured rotation associated with each of the plurality of orthogonal axes and the sequential measurements of the calibration acceleration and the calibration rotation associated with each of the plurality input axes.

DETAILED DESCRIPTION

This disclosure relates generally to sensor systems, and specifically to continuous calibration of an inertial system. An inertial system can include at least one inertial sensor that is configured to measure at least one inertial parameter associated with a respective at least one axis. For example, the at least one inertial sensor can include at least one accelerometer and/or gyroscope that is configured to measure a respective acceleration and/or rotation associated with a given one or more axes. The inertial sensor can also include a calibration system configured to sequentially measure an inertial calibration parameter at each of a plurality input axes. As an example, the calibration system can include a motion controller configured to rotate the calibration system to each of a plurality of orientations associated with the respective plurality of input axes. The calibration system can include an accelerometer and/or a gyroscope configured to measure a calibration acceleration and/or a calibration rotation associated with each of the plurality of input axes. For example, the motion controller can rotate the calibration system to a plurality of angles (e.g., two angles) in each of two orthogonal planes relative to a neutral position, with each of the angles having a relationship with respect to the neutral position (e.g., equal and opposite) and with respect to the at least one axis associated with the at least one inertial sensor for measurement of the inertial parameter in each position between the rotation of the calibration system (e.g., three or more measurements). An inertial processor can thus implement an algorithm (e.g., via a Kalman filter) to substantially cancel bias errors with respect to the inertial sensor in calculating a motion of the inertial sensor (e.g., acceleration and/or rotation). The calibration system can operate continuously in real time, and can thus provide continuous self-calibration of the inertial sensor during dynamic operating conditions.

Figure 1:
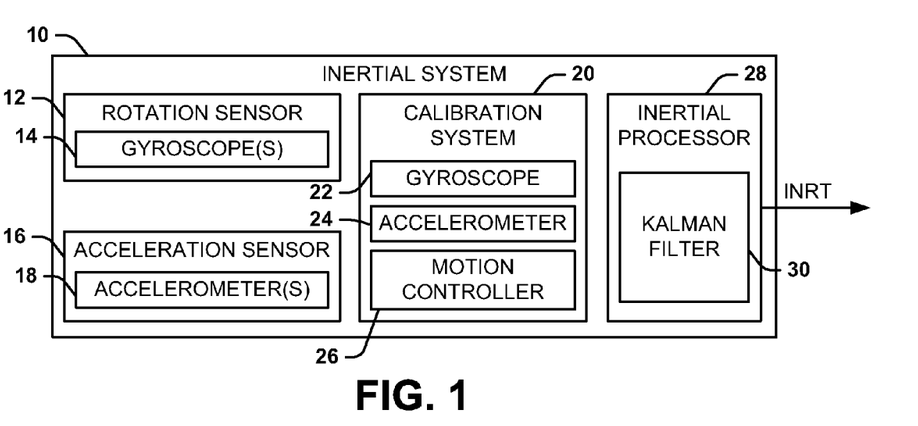
FIG. 1 illustrates an example of an inertial system.

FIG. 1 illustrates an example of an inertial system 10. The inertial system 10 can be implemented in a variety of applications requiring the calculation of motion data, such as in aircraft or spacecraft avionics, guidance systems, nautical applications, and/or a variety of other navigation systems. The inertial system 10 is configured to calculate motion associated with the inertial system 10, demonstrated in the example of FIG. 1 as a signal INRT. As an example, the motion that is measured and calculated by the inertial system 10 can include an acceleration of the inertial system 10 and/or can include a rotation of the inertial system 10.

In the example of FIG. 1, the inertial system 10 includes a rotation sensor 12 that includes at least one gyroscope 14, and includes an acceleration sensor 16 that includes at least one accelerometer 18. The gyroscope(s) 14 can be configured as any of a variety of different types of gyroscopes, such as nuclear magnetic resonance (NMR) gyroscopes, electron paramagnetic resonance (EPR) gyroscopes, optical gyroscopes, vibrating hemispherical mass gyroscopes, and/or any of a variety of other types of gyroscopes configured to measure rotation about a sensitive axis. Similarly, the accelerometer(s) 18 can be configured as any of a variety of different types of accelerometers, such as force-rebalance accelerometers, pendulous-mass accelerometers, optical accelerometers, piezo-electric accelerometers, and/or any of a variety of other types of accelerometers configured to measure acceleration along a sensitive axis. As an example, the rotation sensor 12 can include three gyroscopes 14 that are configured to measure rotation of the inertial system 10 about each of three respective orthogonal axes, and thus about a given vector in three-dimensional space. Similarly, as another example, the acceleration sensor 16 can include three accelerometers 18 that are configure to measure acceleration of the inertial system 10 along each of three respective orthogonal axes, and thus along a given vector in three-dimensional space.

The inertial system 10 also includes a calibration system 20 that is configured to measure at least one inertial calibration parameter at each of a plurality of input axes having a predetermined relationship with the axis or axes associated with the respective rotation sensor 12 and the acceleration sensor 16. In the example of FIG. 1, the calibration system 20 includes a gyroscope 22 and an accelerometer 24 that are configured to measure the inertial calibration parameter, such that the inertial calibration parameter can correspond to a rotation about each of the plurality of input axes and to an acceleration along each of the input axes. The calibration system 20 also includes a motion controller 26 configured to sequentially rotate the calibration system 20 about at least two orthogonal planes to a plurality of different predetermined orientations, such that each of the plurality of predetermined orientations can correspond to a respective one of the plurality of input axes. As an example, the motion controller 26 can include a motor (e.g., a servo motor) that is configured to rotate the calibration system 20 to the predetermined orientations associated with precise angles relative to the orthogonal axes. The sequential rotation of the calibration system 20 to the predetermined orientations can correspond to a calibration sequence. Therefore, during the calibration sequence, the calibration system 20 can measure the rotation of the inertial system 10 about each of the plurality of input axes via the gyroscope 22 and can measure the acceleration of the inertial system 10 along each of the plurality of input axes via the accelerometer 24.

Figure 2:
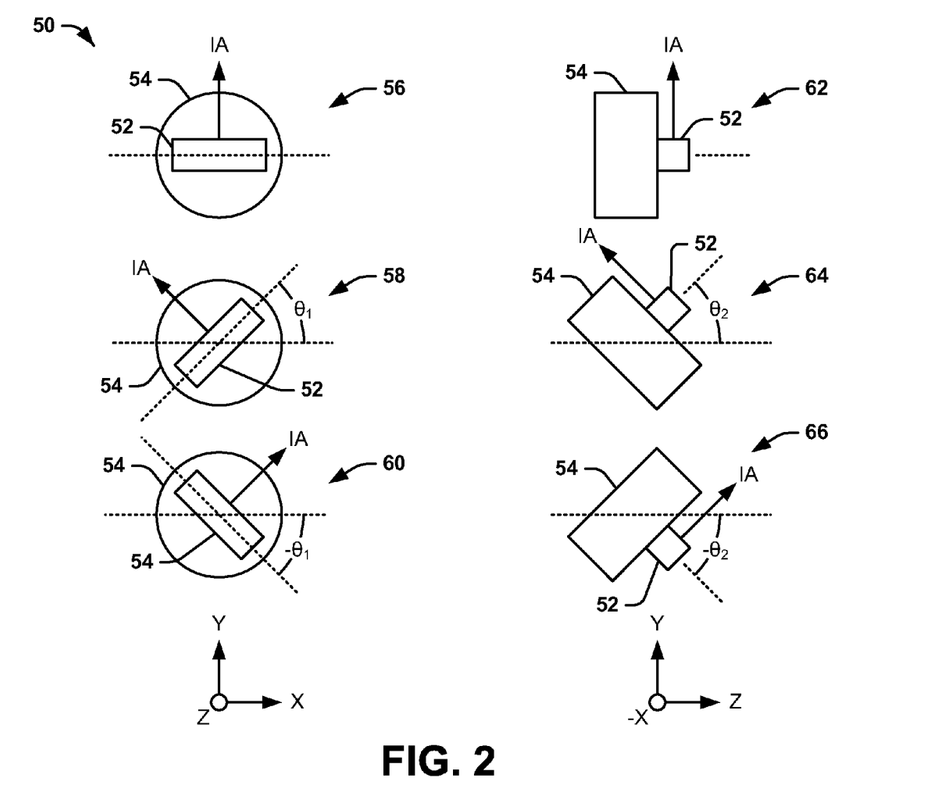
FIG. 2 illustrates an example diagram of a calibration sequence.

FIG. 2 illustrates an example diagram 50 of a calibration sequence of the calibration system 20. In the example of FIG. 2, the calibration system 20 is provided in a polyhedral housing 52 that is coupled to a cylindrical structure 54. The calibration system 20 is demonstrated in five separate orientations demonstrated at 56, 58, and 60 in a "front" view along a Z-axis of the inertial system 10, and at 62, 64, and 66 in a "side" view along an X-axis of the inertial system 10, with the orientations 56 and 62 being the same in separate views. Each of the six orientations 56, 58, 60, 62, 64, and 66 can correspond to separate measurements of inertial calibration parameters during the calibration sequence along separate input axes IA, as described herein. In the following description of the example of FIG. 2, reference is to be made to the example of FIG. 1.

The orientation 56 of the calibration system 20 can correspond to a neutral position, and can thus correspond to a first measurement position for measuring the inertial calibration parameter(s), such as a calibration rotation via the gyroscope 22 about the input axis IA defined by the orientation 56 and/or a calibration acceleration via the accelerometer 24 along the input axis IA defined by the orientation 56. Thus, the orientation 56 can correspond to a first orientation in the calibration sequence, and can have a defined relationship with respect to the one or more orthogonal axes associated with the gyroscope(s) 14 and the accelerometer(s) 18 in the respective rotation sensor 12 and acceleration sensor 16. Subsequent to the orientation 56, the motion controller 26 can rotate the calibration system 20 (e.g., the cylindrical structure 54) to the second orientation 58 corresponding to an angle $\theta_1$ about the Z-axis in the XY-plane of the inertial system 10. The orientation 58 of the calibration system 20 can correspond to a second measurement position for measuring the inertial calibration parameter(s). Therefore, upon achieving the angle $\theta_1$ about the Z-axis of the inertial system 10, the calibration system 20 can obtain a second calibration rotation measurement about the input axis IA defined by the orientation 58 via the gyroscope 22 and/or a second calibration acceleration measurement along the input axis IA defined by the orientation 58 via the accelerometer 24. While the angle $\theta_1$ is demonstrated in the example of FIG. 2 as being approximately 45°, it is to be understood that the angle $\theta_1$ can be any of variety of angles having a defined relationship with respect to the neutral position of the orientation 56.

Subsequent to the orientation 58, the motion controller 26 can rotate the calibration system 20 (e.g., the cylindrical structure 54) to the third orientation 60 corresponding to an angle $-\theta_1$ about the Z-axis in the XY-plane of the inertial system 10, such that the second and third orientations 58 and 60 are demonstrated at equal and opposite angles relative to the neutral position corresponding to the first orientation 56 about the Z-axis of the inertial system 10. The orientation 60 of the calibration system 20 can correspond to a third measurement position for measuring the inertial calibration parameter(s). Therefore, upon achieving the angle $-\theta_1$ about the Z-axis of the inertial system 10, the calibration system 20 can obtain a third calibration rotation measurement about the input axis IA defined by the orientation 60 via the gyroscope 22 and/or a third calibration acceleration measurement along the input axis IA defined by the orientation 60 via the accelerometer 24. Accordingly, the first, second, and third orientations 56, 58, and 60 correspond to inertial calibration parameter measurements in a first plane, demonstrated in the example of FIG. 2 as the XY-plane of the inertial system 10.

Subsequent to the orientation 60, the motion controller 26 can rotate the calibration system 20 (e.g., the cylindrical structure 54) to the fourth orientation 62 corresponding to the neutral position (e.g., equivalent to the first orientation 56). The orientation 62 of the calibration system 20 can correspond to a fourth measurement position for measuring the inertial calibration parameter(s), and thus for measuring a fourth calibration rotation about the input axis IA defined by the orientation 62 and a fourth calibration acceleration along the input axis IA defined by the orientation 62. Alternatively, because the orientation 62 is the same as the orientation 56, the motion controller 26 could instead transition from the third orientation 60 to the fifth orientation 64, instead of ascertaining a linearly independent set of measurements at the orientation 62.

Subsequent to the orientation 62, the motion controller 26 can rotate the calibration system 20 (e.g., the cylindrical structure 54) to the fifth orientation 64 corresponding to an angle $\theta_2$ about the X-axis in the YZ-plane of the inertial system 10. As an example, the angle $\theta_2$ can be approximately equal to the angle $\theta_1$. The orientation 64 of the calibration system 20 can correspond to a fifth measurement position for measuring the inertial calibration parameter(s). Therefore, upon achieving the angle $\theta_2$ about the X-axis of the inertial system 10, the calibration system 20 can obtain a fifth calibration rotation measurement about the input axis IA defined by the orientation 64 via the gyroscope 22 and/or a fifth calibration acceleration measurement along the input axis IA defined by the orientation 64 via the accelerometer 24. While the angle $\theta_2$ is demonstrated in the example of FIG. 2 as being approximately 45°, it is to be understood that the angle $\theta_2$ can be any of variety of angles having a defined relationship with respect to the neutral position of the orientation 62, and may be an angle that is not equal to the angle $\theta_1$. Additionally, while the angles of the orientations 58 and 60 are demonstrated as equal and opposite ($\theta_1$ and $-\theta_1$, respectively) and the angles of the orientations 64 and 66 are demonstrated as equal and opposite ($\theta_2$ and $-\theta_2$, respectively), it is to be understood that the angles of the orientations 58 and 60 and the orientations 64 and 66 are not limited to being equal and opposite with respect to each other, respectively.

Subsequent to the orientation 64, the motion controller 26 can rotate the calibration system 20 (e.g., the cylindrical structure 54) to the sixth orientation 66 corresponding to an angle $-\theta_2$ about the X-axis in the YZ-plane of the inertial system 10, such that the fifth and sixth orientations 64 and 66 are demonstrated at equal and opposite angles relative to the neutral position corresponding to the first orientation 56 (and the fourth orientation 62) about the X-axis of the inertial system 10. The orientation 66 of the calibration system 20 can correspond to a sixth measurement position for measuring the inertial calibration parameter(s). Therefore, upon achieving the angle $-\theta_2$ about the X-axis of the inertial system 10, the calibration system 20 can obtain a sixth calibration rotation measurement about the input axis IA defined by the orientation 66 via the gyroscope 22 and/or a sixth calibration acceleration measurement along the input axis IA defined by the orientation 66 via the accelerometer 24. Accordingly, the fourth, fifth, and sixth orientations 62, 64, and 66 correspond to inertial calibration parameter measurements in a second plane, demonstrated in the example of FIG. 2 as the YZ-plane of the inertial system 10, that is orthogonal to the first plane (e.g., the XY-axis).

Accordingly, the calibration procedure demonstrated in the example of FIG. 2 provides for a sequential series of measurements of the inertial calibration parameter(s) in two orthogonal planes. Because the neutral position of the orientations 56 and 62 have a defined relationship with respect to the one or more orthogonal axes associated with the gyroscope(s) 14 and the accelerometer(s) 18, and because the angles $\theta_1$, $-\theta_1$, $\theta_2$, and $-\theta_2$ associated with the respective orientations 58, 60, 64, and 66 have defined relationships with respect to the neutral position, the measurements of the inertial calibration parameter(s) can likewise have mathematical relationships to the measurements of the inertial parameter(s) that are provided by the rotation sensor 12 and the acceleration sensor 16. For example, the measurements of the inertial calibration parameter(s) in the six orientations 56, 58, 60, 62, 64, and 66 can have vector components in three orthogonal axes. As a result, the measured inertial calibration parameter(s) can be implemented to substantially continuously calibrate the rotation sensor 12 and the acceleration sensor 16 based on rendering bias errors observable and canceling the bias errors based on a combination of the measurements of the inertial parameter(s) and the inertial calibration parameter(s). In addition, it is to be understood that the orientations 58 and 60 can be combined with the orientations 64 and 66, such as to provide greater than five different linearly independent measurements in a given calibration procedure.

Referring back to the example of FIG. 1, the inertial system 10 includes an inertial processor 28 that is configured to calculate motion of the inertial system 10 based on the inertial parameter(s) associated with each of the respective at least one orthogonal axis and the sequential measurements of the inertial calibration parameter(s) at each of the plurality of input axes associated with the rotation sensor 12 and the acceleration sensor 16. In the example of FIG. 1, the inertial processor 28 includes a Kalman filter 30 that is configured to implement an algorithm for calculating a bias error associated with the measured inertial parameter(s) based on the measured inertial calibration parameter(s) at each of the plurality input axes associated with the respective orientations of the calibration system 20. As an example, the Kalman filter 30 is configured to solve a set of equations that substantially cancel the varying input rotation measured by the gyroscope 22 and the varying input accelerations measured by the accelerometer 24 to estimate a residual bias associated with the gyroscope(s) 14 and 22, and the accelerometer(s) 18 and 24, such that the estimated residual bias errors can be mitigated from the calculation of the motion of the inertial system 10 by the inertial processor 28. For example, based on the rotation of calibration system 20 via the motion controller 26 to the different orientations, such as in two orthogonal planes and with respect to substantially equal and opposite angles with respect to a neutral position, the bias errors of the gyroscope(s) 14 and the accelerometer(s) 18 can be rendered observable and can be substantially mitigated from the calculation of the inertial motion of the inertial system 10.

As described previously, the calibration system 20 can sequentially rotate to the respective orientations, such as demonstrated in the example of FIG. 2, repeatedly. As a result, the calibration system 20 can substantially continuously provide calibration of the rotation sensor 12 and the acceleration sensor 16 in real-time during operation of the inertial system 10 in dynamic environments. As an example, the calibration system 20 can be configured to substantially remove bias errors from bias sources over time and temperature, such as mechanical distortion, electronic offsets, charge relaxation, and/or hysteresis. Additionally, because the calibration system 20 implements only a single gyroscope 14 and/or a single accelerometer 18, the calibration system 20 operates in a less expensive and more simplistic manner than typical calibration systems that implement redundant sensors for each orthogonal axis in three-dimensions.

It is to be understood that the inertial system 10 and the calibration procedure demonstrated in the diagram 50 are not limited to the examples demonstrated in the example of FIGS. 1 and 2. For example, the inertial system 10 is not limited to including both the rotation sensor 12 and the acceleration sensor 16, but could include only one of the rotation sensor 12 and the acceleration sensor 16. Thus, the calibration system 20 is likewise not limited to including both the gyroscope 22 and the accelerometer 24, but could include one or the other, respectively. Additionally, the calibration system demonstrated by the diagram 50 is not limited to the six orientations 56, 58, 60, 62, 64, and 66, but could include more or less orientations, and could omit movement to the neutral position of the orientation 62, such that the calibration procedure could only include five measurements during the sequence of orientations of the calibration procedure. Therefore, the inertial system 10 can be configured in any of a variety of ways. For example, the calibration system 20 is not limited to be included as part of the inertial system 10, but may be a separate component mounted external to the inertial system 10 for use with any other existing or future inertial system.

Figure 3:
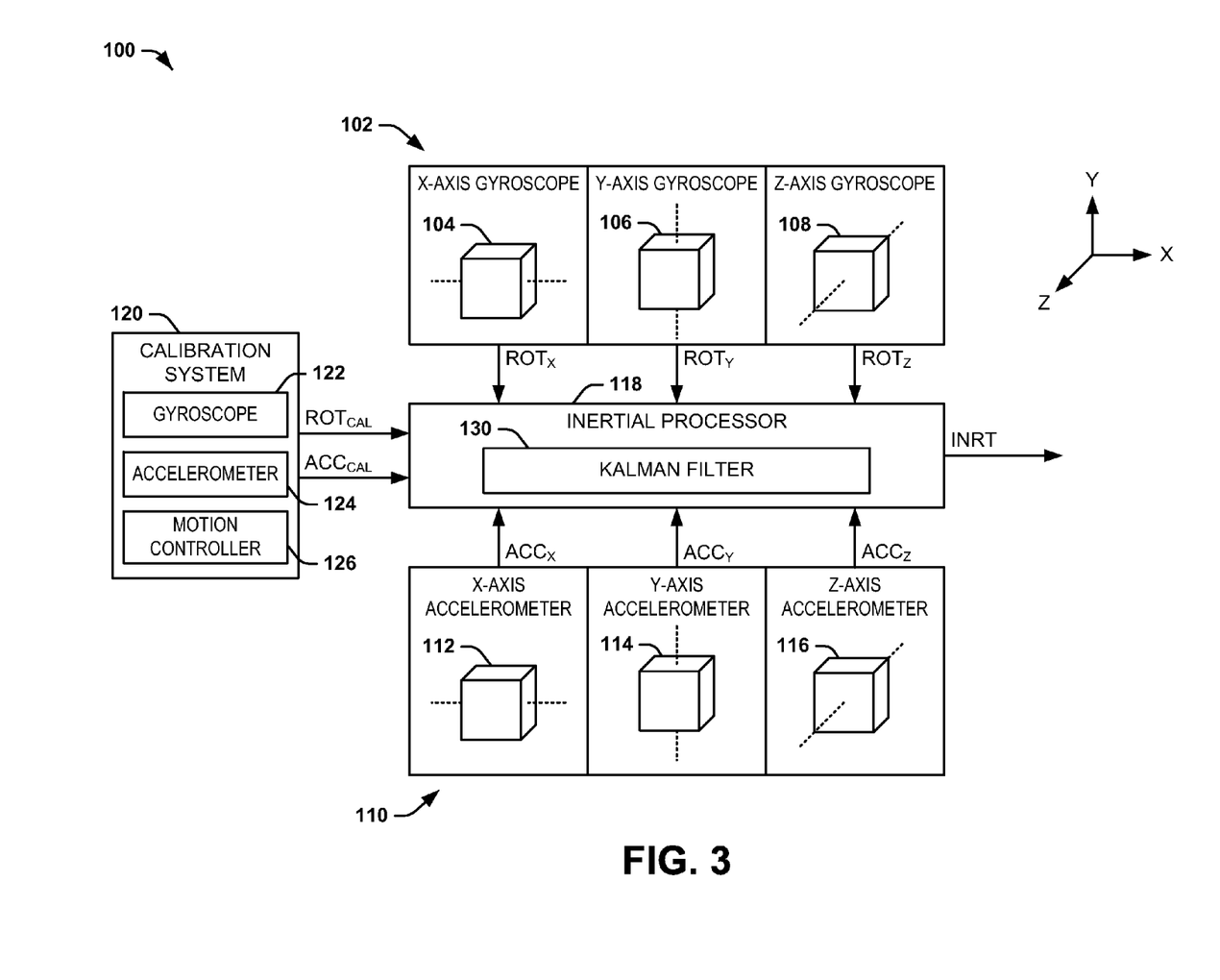
FIG. 3 illustrates another example of an inertial system.

FIG. 3 illustrates another example of an inertial system 100. The inertial system 100 can be implemented in a variety of applications requiring the calculation of motion data, such as in aircraft or spacecraft avionics, guidance systems, nautical applications, and/or a variety of other navigation systems. The inertial system 100 is configured to calculate motion associated with the inertial system 100, demonstrated in the example of FIG. 3 as a signal INRT. As an example, the motion that is measured and calculated by the inertial system 100 includes an acceleration and a rotation of the inertial system 100.

In the example of FIG. 3, the inertial system 100 includes a rotation sensor 102 that includes an X-axis gyroscope 104 configured to measure a rotation of the inertial system 100 about the X-axis, a Y-axis gyroscope 106 configured to measure a rotation of the inertial system 100 about the Y-axis, and a Z-axis gyroscope 108 configured to measure a rotation of the inertial system 100 about the Z-axis. In the example of FIG. 3, the measured rotations are demonstrated as respective signals $ROT_X$, $ROT_Y$, and $ROT_Z$. The gyroscopes 104, 106, and 108 can be configured as any of a variety of different types of gyroscopes. Therefore, the rotation sensor 102 can thus measure rotation of the inertial system 100 about each of three respective orthogonal axes based on the gyroscopes 104, 106, and 108, and thus about a given vector in three-dimensional space. The inertial system 100 also includes an acceleration sensor 110 that includes an X-axis accelerometer 112 configured to measure an acceleration of the inertial system 100 along the X-axis, a Y-axis accelerometer 114 configured to measure an acceleration of the inertial system 100 along the Y-axis, and a Z-axis accelerometer 116 configured to measure an acceleration of the inertial system 100 along the Z-axis. In the example of FIG. 3, the measured accelerations are demonstrated as respective signals $ACC_X$, $ACC_Y$, and $ACC_Z$. The accelerometers 112, 114, and 116 can be configured as any of a variety of different types of accelerometers. Therefore, the acceleration sensor 110 can thus measure acceleration of the inertial system 100 along each of three respective orthogonal axes based on the accelerometers 112, 114, and 116, and thus along a given vector in three-dimensional space.

In the example of FIG. 3, the signals $ROT_X$, $ROT_Y$, and $ROT_Z$ and $ACC_X$, $ACC_Y$, and $ACC_Z$ are demonstrated as being provided to an inertial processor 118. The inertial system 118 is configured to calculate motion of the inertial system 100 based on the signals $ROT_X$, $ROT_Y$, and $ROT_Z$ and $ACC_X$, $ACC_Y$, and $ACC_Z$ corresponding to the rotations and accelerations about and along each of the X, Y, and Z-axes. In addition, the inertial system 100 also includes a calibration system 120. The calibration system 120 includes a gyroscope 122 that is configured to measure a calibration rotation $ROT_{CAL}$ and an accelerometer 124 that is configured to measure a calibration acceleration $ACC_{CAL}$ at each of a plurality of input axes. As an example, the calibration system 120 can be configured substantially similar to the calibration system 20 in the example of FIG. 1.

In the example of FIG. 3, the calibration system 120 includes a motion controller 126 that is configured to rotate the calibration system 120 to a plurality of orientations associated with a respective plurality of input axes, such as demonstrated in the example of FIG. 2. Therefore, the calibration system 120 can measure a rotation about the input axis IA associated with each orientation of the calibration procedure via the gyroscope 122, and the calibration system 120 can measure an acceleration along the input axis IA associated with each orientation of the calibration procedure via the accelerometer 124. Accordingly, the calibration system 120 can be configured to substantially mitigate bias errors associated with the measurements of the gyroscopes 104, 106, and 108 and the accelerometers 112, 114, and 116 in real-time during dynamic operation conditions, as described herein. In the example of FIG. 3, the inertial processor 118 includes a Kalman filter 130 that is configured to implement an algorithm for calculating bias errors associated with the motion of the inertial system 100 based on the calibration rotation $\theta_{CAL}$ and the calibration acceleration $ACC_{CAL}$ at each of the plurality input axes. Accordingly, the inertial processor 118 can substantially mitigate the bias errors in the calculation of the motion INRT of the inertial system 100.

As an example, the calibration system 120 can mitigate bias errors in the acceleration sensor 110 in the following manner. The inertial processor 118 can receive sequential measurements of the acceleration $ACC_X$ and the acceleration $ACC_Y$ in the X and Y-axes, respectively, along with the calibration acceleration measurements $ACC_{CAL}$. Each of the accelerometers 112, 114, and 116 have associated respective biases $B_X$, $B_Y$, and $B_Z$, and the accelerometer 124 has an associated bias $B_{CAL}$. In this following example, the angles $\theta_1$ and $-\theta_1$ in the respective orientations 58 and 60 can be 30° and −30°, respectively. Therefore, the measurements of the accelerometers 112, 114, 116, and 124 at a first orientation corresponding to the orientation 56 can be expressed as:

$$ACC_{X1} = A_{X1} + B_X$$

$$ACC_{Y1} = A_{Y1} + B_Y$$

$$ACC_{Z1} = A_{Z1} + B_Z$$

$$ACC_{CAL1} = A_{Y1} + B_{CAL} \qquad \text{Equations 1}$$

Where: $A_X$, $A_Y$, and $A_Z$ are acceleration magnitudes.

Similarly, the measurements of the accelerometers 112, 114, 116, and 124 at a second orientation corresponding to the orientation 58 can be expressed as:

$$ACC_{X2} = A_{X2} + B_X$$

$$ACC_{Y2} = A_{Y2} + B_Y$$

$$ACC_{Z2} = A_{Z2} + B_Z$$

$$ACC_{CAL2} = -0.5 * A_{X2} + 0.866 * A_{Y2} + B_{CAL} \qquad \text{Equations 2}$$

Similarly, the measurements of the accelerometers 112, 114, 116, and 124 at a third orientation corresponding to the orientation 60 can be expressed as:

$$ACC_{X3} = A_{X3} + B_X$$

$$ACC_{Y3} = A_{Y3} + B_Y$$

$$ACC_{Z3} = A_{Z3} + B_Z$$

$$ACC_{CAL3} = 0.5 * A_{X3} + 0.866 * A_{Y3} + B_{CAL} \qquad \text{Equations 3}$$

During the calibration sequence (e.g., the calibration sequence demonstrated in the example of FIG. 2), the inertial processor 118 can also receive sequential measurements of the acceleration $ACC_Y$ and the acceleration $ACC_Z$ in the Y and Z-axes, respectively, along with the calibration acceleration measurements $ACC_{CAL}$. The accelerometer 116 likewise has an associated bias $B_Z$. In this following example, the angles $\theta_2$ and $-\theta_2$ in the respective orientations 64 and 66 can also be 30° and −30°, respectively. Therefore, the measurements of the accelerometers 114, 116, and 124 at a fourth orientation corresponding to the orientation 62 can be expressed as:

$$ACC_{X4} = A_{X4} + B_X$$

$$ACC_{Y4} = A_{Y4} + B_Y$$

$$ACC_{Z4} = A_{Z3} + B_Z$$

$$ACC_{CAL3} = A_{Y4} + B_{CAL} \quad \text{Equations 4}$$

Similarly, the measurements of the accelerometers 112, 114, 116, and 124 at a fifth orientation corresponding to the orientation 64 can be expressed as:

$$ACC_{X5} = A_{X5} + B_X$$

$$ACC_{Y5} = A_{Y5} + B_Y$$

$$ACC_{Z5} = A_{Z5} + B_Z$$

$$ACC_{CAL5} = 0.866 * A_{Y5} - 0.5 * A_{Z5} + B_{CAL} \quad \text{Equations 5}$$

Similarly, the measurements of the accelerometers 112, 114, 116, and 124 at a sixth orientation corresponding to the orientation 66 can be expressed as:

$$ACC_{X6} = A_{X6} + B_X$$

$$ACC_{Y6} = A_{Y6} + B_Y$$

$$ACC_{Z6} = A_{Z6} + B_Z$$

$$ACC_{CAL6} = 0.866 * A_{Y6} + 0.5 * A + B_{CAL} \quad \text{Equations 6}$$

Based on the Equations 1 through 6, the Kalman filter 130 can be configured to implement an algorithm to solve for the biases $B_X$, $B_Y$, $B_Z$, and $B_{CAL}$. For example, the Kalman filter 130 can implement a set of matrices to calculate a set of coefficients, such that the Kalman filter 130 can implement a set of canceling equations to solve for the biases $B_X$, $B_Y$, $B_Z$, and $B_{CAL}$ as estimates. Accordingly, the inertial processor 118 can apply the estimates of the biases $B_X$, $B_Y$, $B_Z$, and $B_{CAL}$ to the measurements of the accelerations $ACC_X$, $ACC_Y$, and $ACC_Z$ to calculate an acceleration of the inertial system 100 as a portion of the motion INRT. In a substantially similar manner, the Kalman filter 130 can calculate estimates of the biases associated with the gyroscopes 104, 106, and 108, as well as the gyroscope 122. Accordingly, the inertial processor 118 can apply the estimates of the biases to the measurements of the rotations $ROT_X$, $ROT_Y$, and $ROT_Z$ to calculate a rotation of the inertial system 100 as a portion of the motion INRT. As described previously, the calibration system 120 can substantially continuously cycle through the calibration procedure, and can thus continuously update the estimates of the biases of the accelerometers 112, 114, 116, and 124 and the gyroscopes 104, 106, 108, and 122. Accordingly, the inertial processor 118 can substantially continuously calculate the motion INRT of the inertial system 100 in a manner that substantially mitigates errors from bias in real-time in a dynamic environment.

Figure 4:
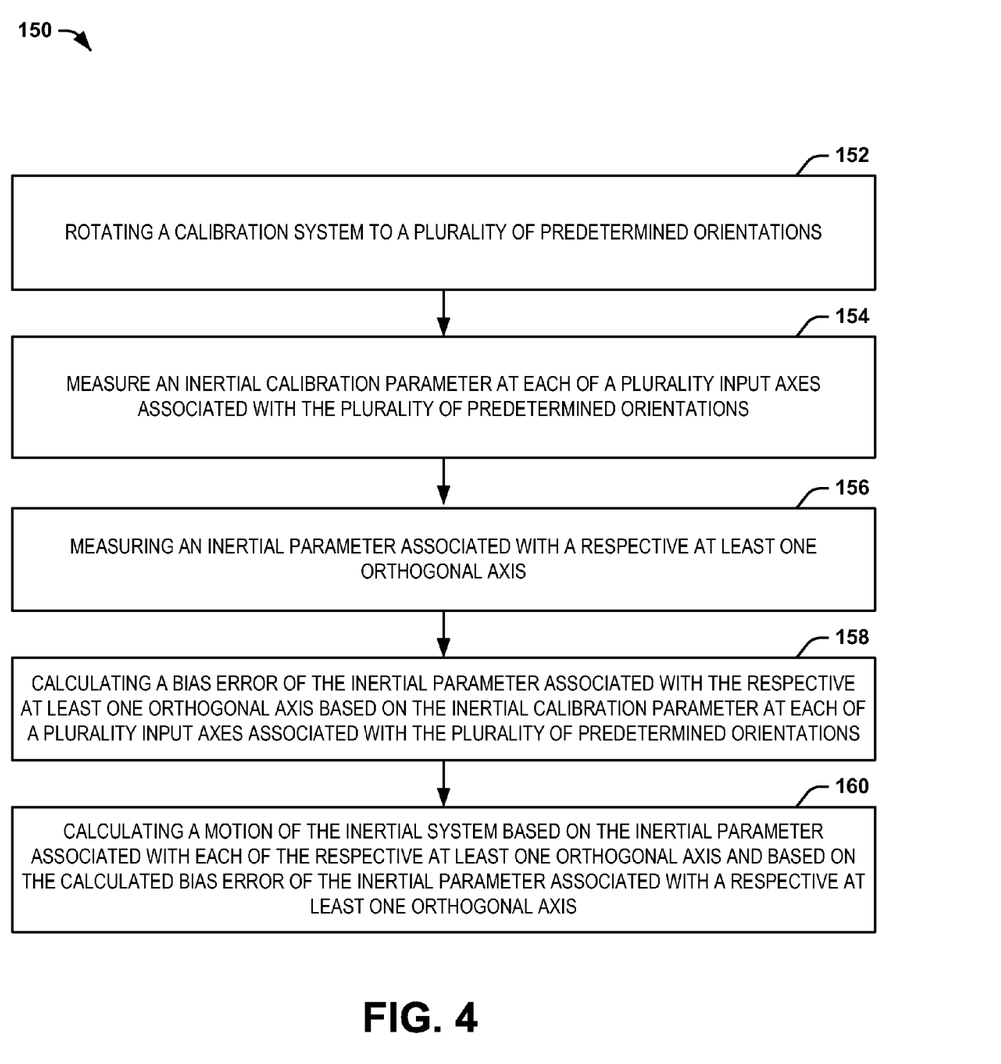
FIG. 4 illustrates an example of a method for calculating an inertial parameter.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for calculating an inertial parameter (e.g., an acceleration and/or a rotation). At 152, a calibration system (e.g., the calibration system 20) is rotated to a plurality of predetermined orientations (e.g., the orientations 56, 58, 60, 62, 64, and 66). At 154, an inertial calibration parameter (e.g., a calibration acceleration and/or a calibration rotation) is measured at each of a plurality input axes associated with the plurality of predetermined orientations. The plurality of input axes can be associated with each of a first plane (e.g., the XY-plane) and a second plane (e.g., the XZ-plane) that are orthogonal with respect to each other. At 156, an inertial parameter associated with a respective at least one orthogonal axis is measured (e.g., an acceleration and/or a rotation along and/or about one or more orthogonal axes). At 158, a bias error (e.g., the bias errors $B_X$, $B_Y$, $B_Z$, and $B_{CAL}$) of the inertial parameter associated with the respective at least one orthogonal axis is calculated based on the inertial calibration parameter at each of a plurality input axes associated with the plurality of predetermined orientations. At 160, a motion of the inertial system (e.g., the motion INRT) is calculated based on the inertial parameter associated with each of the respective at least one orthogonal axis and based on the calculated bias error of the inertial parameter associated with a respective at least one orthogonal axis.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An inertial system comprising:
   at least one inertial sensor configured to measure an inertial parameter associated with each of at least one axis;
   a calibration system configured to sequentially measure an inertial calibration parameter at each of a plurality input axes;
   a motion controller configured to sequentially rotate the calibration system about a pivot to each of a plurality of predetermined orientations such that the calibration system is rotated between a neutral position corresponding to a first predetermined orientation, a first predetermined angle with respect to the neutral position corresponding to a second predetermined orientation, and a second angle with respect to the neutral position corresponding to a third predetermined orientation; and
   an inertial processor configured to calculate motion of the inertial system based on the inertial parameter associated with each of the respective at least one axis and the sequential measurements of the inertial calibration parameter at each of the plurality of input axes associated with each of the respective plurality of predetermined orientations.

2. The inertial system of claim 1, wherein the at least one inertial sensor comprises at least one of one or more accelerometers and one or more gyroscopes, and wherein the calibration system comprises at least one of a calibration accelerometer and a calibration gyroscope.

3. The inertial system of claim 2, wherein the one or more accelerometers comprises a first accelerometer, a second accelerometer, and a third accelerometer configured to calculate an acceleration along a first axis, a second axis, and a third axis, respectively, that are orthogonal with respect to each other, and wherein the calibration system comprises the calibration accelerometer configured to calculate an acceleration along the plurality of input axes having a predetermined relationship with respect to the first, second, and third axes.

4. The inertial system of claim 2, wherein the one or more gyroscopes comprises a first gyroscope, a second gyroscope, and a third gyroscope configured to calculate a rotation about a first axis, a second axis, and a third axis, respectively, that are orthogonal with respect to each other, and wherein the calibration system comprises the calibration gyroscope configured to calculate a rotation about the plurality of input axes having a predetermined relationship with respect to the first, second, and third axes.

5. The inertial system of claim 1, wherein the motion controller sequentially rotates the calibration system about the pivot to each of the plurality of predetermined orientations to enable the calibration system to measure the inertial calibration parameter at each of the plurality input axes associated with each of the respective plurality of predetermined orientations.

6. The inertial system of claim 5, wherein the motion controller is configured to sequentially rotate the calibration system between the neutral position corresponding to the first predetermined orientation, a third predetermined angle with respect to the neutral position corresponding to a fourth predetermined orientation, and a fourth angle with respect to the neutral position corresponding to a fifth predetermined orientation.

7. The inertial system of claim 1, wherein the inertial processor comprises a Kalman filter configured to implement an algorithm for calculating a bias error associated with the inertial parameter based on the inertial calibration parameter at each of the plurality input axes, such that the inertial processor is configured to substantially mitigate the bias error in the calculation of the motion of the inertial system.

8. The inertial system of claim 7, wherein the Kalman filter is configured to implement the algorithm for calculating a first bias error associated with an angular rotation rate about each of the at least one axis based on a calibration rotation angle about each of the plurality input axes, and for calculating a second bias error associated with an acceleration along each of the at least one axis based on a calibration acceleration along each of the plurality input axes, such that the inertial processor is configured to substantially mitigate the first and second bias errors in the calculation of the motion of the inertial system.

9. The inertial system of claim 1, wherein the a motion controller is further configured to enable the calibration system to measure the inertial calibration parameter in a predetermined sequence in each of the plurality input axes in each of a first plane and a second plane that are orthogonal with respect to each other.

10. A method for calculating an inertial parameter, the method comprising:
rotating a calibration system sequentially about a pivot to each of a plurality of predetermined orientations such that the calibration system is rotated between a neutral position corresponding to a first predetermined orientation, a first predetermined angle with respect to the neutral position corresponding to a second predetermined orientation, and a second angle with respect to the neutral position corresponding to a third predetermined orientation;
measure an inertial calibration parameter at each of a plurality input axes associated with each of the plurality of predetermined orientations, the plurality of input axes being associated with each of a first plane and a second plane that are orthogonal with respect to each other;
measuring an inertial parameter associated with a respective at least one orthogonal axis;
calculating a bias error of the inertial parameter associated with the respective at least one orthogonal axis based on the inertial calibration parameter at each of a plurality input axes associated with the plurality of predetermined orientations; and
calculating a motion of the inertial system based on the inertial parameter associated with each of the respective at least one orthogonal axis and based on the calculated bias error of the inertial parameter associated with a respective at least one orthogonal axis.

11. The method of claim 10, wherein measuring the inertial parameter comprises:
measuring an acceleration along the respective at least one orthogonal axis; and
measuring a rotation about the respective at least one orthogonal axis.

12. The method of claim 11, wherein measuring the inertial calibration parameter at each of the plurality input axes comprises:
measuring a calibration acceleration along each of the plurality input axes associated with the plurality of predetermined orientations; and
measuring a calibration rotation about each of the plurality of input axes associated with the plurality of predetermined orientations.

13. The method of claim 10, wherein measuring the inertial parameter comprises measuring the inertial parameter associated with each of a first axis, a second axis, and a third axis, wherein the first, second, and third axes are orthogonal with respect to each other.

14. The method of claim 10, wherein calculating the bias error of the inertial parameter comprises implementing an algorithm for calculating the bias error associated with the inertial parameter based on the inertial calibration parameter at each of the plurality input axes via a Kalman filter, wherein calculating the motion of the inertial system comprises canceling the bias error from the inertial parameter associated with a respective at least one orthogonal axis.

15. The method of claim 10, sequentially rotating the calibration system further comprises rotating the calibration system between, a third predetermined angle with respect to the neutral position corresponding to a fourth predetermined orientation, and a fourth angle with respect to the neutral position corresponding to a fifth predetermined orientation.

16. An inertial system comprising:
a plurality of accelerometers configured to measure an acceleration along each of a respective plurality of orthogonal axes;

a plurality of gyroscopes configured to measure a rotation about each of the respective plurality of orthogonal axes;

a calibration system configured to sequentially measure a calibration acceleration and a calibration rotation associated with each of a plurality input axes having a predetermined relationship with the plurality of orthogonal axes;

a motion controller configured to sequentially rotate the calibration system about a pivot to each of a plurality of predetermined orientations such that the calibration system is rotated between a neutral position corresponding to a first predetermined orientation, a first predetermined angle with respect to the neutral position corresponding to a second predetermined orientation, and a second angle with respect to the neutral position corresponding to a third predetermined orientation; and an inertial processor configured to calculate motion of the inertial system based on the measured acceleration and the measured rotation associated with each of the plurality of orthogonal axes and the sequential measurements of the calibration acceleration and the calibration rotation associated with each of the plurality input axes.

17. The inertial system of claim 16, wherein the motion controller sequentially rotates the calibration system about the pivot to each of the plurality of predetermined orientations to enable the calibration system to measure the calibration acceleration and the calibration rotation associated with each of the plurality input axes associated with each of the respective plurality of predetermined orientations.

18. The inertial system of claim 17, wherein the motion controller is further configured to sequentially rotate the calibration system between, a third predetermined angle with respect to the neutral position corresponding to a fourth predetermined orientation, and a fourth angle with respect to the neutral position corresponding to a fifth predetermined orientation.

19. The inertial system of claim 16, wherein the inertial processor comprises a Kalman filter configured to implement an algorithm for calculating a first bias error associated with the rotation about each of the respective plurality of orthogonal axes based on the calibration rotation about each of the plurality input axes, and for calculating a second bias error associated with the acceleration along each of a respective plurality of orthogonal axes based on the calibration acceleration along each of the plurality input axes, such that the inertial processor is configured to substantially mitigate the first and second bias errors in the calculation of the motion of the inertial system.

* * * * *

UNITED STATES PATENT AND TRADEMARK OFFICE
CERTIFICATE OF CORRECTION

| | | |
|---|---|---|
| PATENT NO. | : 9,651,399 B2 | Page 1 of 1 |
| APPLICATION NO. | : 14/668465 | |
| DATED | : May 16, 2017 | |
| INVENTOR(S) | : Robert E. Stewart et al. | |

It is certified that error appears in the above-identified patent and that said Letters Patent is hereby corrected as shown below:

In the Claims

Column 11, Line 62 reads "the a motion" should read --the motion--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*